(12) United States Patent
Sato

(10) Patent No.: US 7,231,174 B2
(45) Date of Patent: Jun. 12, 2007

(54) DATA DISTRIBUTION SYSTEM AND METHOD, AND ELECTRIC EQUIPMENT TO BE USED THEREFOR

(75) Inventor: Yasushi Sato, Nagareyama (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 969 days.

(21) Appl. No.: 10/204,901

(22) PCT Filed: Jan. 29, 2001

(86) PCT No.: PCT/JP01/00575

§ 371 (c)(1),
(2), (4) Date: Aug. 26, 2002

(87) PCT Pub. No.: WO01/65720

PCT Pub. Date: Sep. 7, 2001

(65) Prior Publication Data

US 2003/0022624 A1    Jan. 30, 2003

(30) Foreign Application Priority Data

Feb. 29, 2000 (JP) ............... 2000-055009
Feb. 29, 2000 (JP) ............... 2000-055034
Mar. 2, 2000 (JP) ............... 2000-057114

(51) Int. Cl.
*H04H 1/00* (2006.01)
(52) U.S. Cl. ............ 455/3.01; 455/12.1; 455/3.02; 455/419
(58) Field of Classification Search ............ 455/13.1, 455/3.01, 3.02, 3.03, 3.04, 12.1, 420, 414.3, 455/11.1, 427, 428, 426.1, 7, 414.4, 419, 455/9, 517; 370/338, 352, 389
See application file for complete search history.

(56) References Cited

U.S. PATENT DOCUMENTS 5,915,207 A    6/1999 Dao et al.

(Continued)

FOREIGN PATENT DOCUMENTS

EP    0 537 756 A2    4/1993

(Continued)

OTHER PUBLICATIONS

Written Notification of Reason for Refusal in Counterpart Japanese Application No. 2000-057114, Japanese Patent Office, Nov. 25, 2003, 4 pages (including English Translation).

(Continued)

*Primary Examiner*—Edward F. Urban
*Assistant Examiner*—John J. Lee
(74) *Attorney, Agent, or Firm*—Eric J. Robinson; Robinson Intellectual Property Law Office, P.C.

(57) ABSTRACT

The present invention I related to a contents provider supplies encoded contents to a transmitting station, and broadcasts the encoded contents via a satellite. At a gas station inside a service area of the satellite, a base station to receive the contents from the satellite is disposed. The contents provider transmits to each base station decoding keys to decode the transmitted contents via the Internet. The base station relates the received contents to the decoding keys to store in a large capacity memory. When a vehicle stops by at the gas station, a vehicle-mounted apparatus communicates with the base station so as to download the contents, accumulate in a memory, and reproduce. This enables digital contents to be distributed to a mobile body with small-scale equipment.

12 Claims, 9 Drawing Sheets

U.S. PATENT DOCUMENTS

| | | | |
|---|---|---|---|
| 6,038,594 A * | 3/2000 | Puente et al. | 709/217 |
| 6,141,333 A * | 10/2000 | Chavez, Jr. | 370/338 |
| 6,889,032 B2 * | 5/2005 | Dao et al. | 455/11.1 |

FOREIGN PATENT DOCUMENTS

| | | |
|---|---|---|
| JP | 03-078364 | 8/1991 |
| JP | 03-197194 | 8/1991 |
| JP | 05-122173 | 5/1993 |
| JP | 06-067910 | 3/1994 |
| JP | 07-210408 | 8/1995 |
| JP | 07-220032 | 8/1995 |
| JP | 08-125651 | 5/1996 |
| JP | 10-117173 | 5/1998 |
| JP | 10-155176 | 6/1998 |
| JP | 10-178421 | 6/1998 |
| JP | 10-506517 | 6/1998 |
| JP | 11-317063 | 11/1999 |
| JP | 2000-029942 | 1/2000 |

OTHER PUBLICATIONS

Notification of Reason Refusal dated Oct. 26, 2004 for JP 057114/2000.

Written Notification of Reason for Refusal dated Mar. 15, 2005 for Application No. JP 2000-055009.

International Search Report dated Jun. 22, 2001.

* cited by examiner

DATA DISTRIBUTION SYSTEM AND METHOD, AND ELECTRIC EQUIPMENT TO BE USED THEREFOR

TECHNICAL FIELD

This invention relates to a contents distribution system (method) which is configured to transmit the contents to a desired base station by using a satellite, to implement transmission to an apparatus installed in a mobile body via wireless system from this base station, and record and reproduce with a reception-reproduction apparatus, as well as electric equipment provided with a detachable operation panel, and electric equipment provided with a detachable data memory, suitable for use in this system, etc.

BACKGROUND ART

In the field of broadcasting system, a satellite broadcasting system which can provide with local service covering a wide range has been developed and diversification of broadcasting service is being planned. In such a satellite broadcasting system, compared with an existing broadcasting system, without requiring any large-scale broadcasting equipment on the ground, it is realizable that broadcasting signals containing images and sounds are provided to a wide range of service area.

However, conventional satellite broadcasting system has a problem that it cannot implement reception unless it comprises comparatively large-scale reception system. That is, radio wave for satellite broadcasting is very weak, and therefore was considered to require a comparatively large receiving antenna, etc.

Radio wave from a satellite is also being received by a base station, etc. so that this is redistribution via a CATV network, but a reception terminal (set top box) of CATV, etc. is necessary. In addition, under a mobile environment it does not work.

This invention was made in view of the above described actual situation, and a first objective hereof is to make digital contents transmittable to a mobile body with a small scale deployment.

As a conventional contents distribution apparatus for such a mobile body terminal, for example, "Information Supply system for Vehicles" (Japanese Laid Open Gazette No. 10-73440) which is configured to receive music or map data by connecting a plug for information transmission provided in the vicinity of an oil supply nozzle at a gas station with a connector for reception provided in the vicinity of an oil supply orifice of an automobile, "Digital Information Distribution System" (Japanese Laid Open Gazette No. 11-168464) which receives distribution of music information and the like by connecting an information recording-reproducing device in a customer's possession with a vending machine exclusive for digital information, "Digital Information Distribution System" (Japanese Laid Open Gazette No. 11-191266) which is configured so that a plurality of music distribution terminals are brought into connection with a service center which digitalize a large amount of music data to store by way of communication lines, and "Digital Information Distribution System" (Japanese Laid Open Gazette No. 2000-48479) which is configured to perform reproduction by bringing a user's information reproducing terminal into connection with a music information vending terminal via a predetermined interface, sending and receiving encoded music information and the user's ID, and decoding the encoded information, and the like, are known.

Next, vehicle electronic equipment as a receiving terminal installed in a mobile body in the above described contents distribution system is provided with various antitheft device.

For example, panel detachable type vehicle electronic equipment (panel detachable type equipment), in which an operation panel disposed in the front surface is detachable, is given as an example. This panel detachable equipment has a operation panel which is removed by a user at the time when he/she leaves the car for a long time so as to make the equipment unusable as well as to place the equipment under incomplete state for antitheft. An example of technology of such a panel detachable equipment is disclosed in Japanese Laid Open Gazette No. 6-252565.

In such conventional panel detachable equipment, antitheft can be planned by physically removing a operation panel, but the operation panel under the removed state could not be used effectively. That is, the operation panel under the removed state could not be used at all, and in spite of its smallness, it turned out to be burdensome.

A similar problem is broadly applicable to electric equipment comprising a detachable operation panel.

The present invention, which was made in view of the above described actual conditions, has a second objective to provide electric equipment which can utilize effectively a operation panel under removed state, and a panel which can be utilized effectively under removed state, and to provide vehicle electronic equipment for planning antitheft as well as effective use.

Moreover, as the above described electric equipment, there is one which uses a semiconductor element, especially a flash memory which is a nonvolatile memory having a large capacity and being rewritable, as storage medium. This kind of electric equipment does not need any rotary driving portion, and can make an apparatus smaller and control consumed energy.

However, a flash memory has a problem that it has a narrow working temperature range. Normally, around 65° C. is the limit. In addition, when the temperature to not less than the temperature, recorded data could even disappear.

In normal electric equipment, the temperature inside the apparatus does not frequently up to 65° C., and even so, can be coped with an appropriate ventilating mechanism being provided.

However, in case of an apparatus to be mounted on a vehicle, due to its peculiarity on installation site such as that the main body portion is stored in a dashboard of the vehicle, it is not exceptional that the temperature increases to not less than 65° C. Moreover, inside a vehicle in summer, even at time of stopping, the temperature happens to reach around 100° C.

Due to this, simple use of a flash memory in electric equipment to be mounded on a vehicle as memory media gives rise to a problem that it lacks stability and reliability.

Similar problem commonly exists in electric equipment to be mounded on vehicles which stores not only music data but also image data such as map data, text data, etc. in a flash memory for use.

The present invention, which was made in view of the above described actual conditions, has a third objective to improve reliability of electric equipment to be mounted on a vehicle in which semiconductor recording element is used as storage medium, and to use the semiconductor recording element within an appropriate temperature range.

DISCLOSURE OF THE INVENTION

In order to attain the above described first objective, a contents distribution system related to the first view point of the present invention is configured by comprising:

transmission means to transmit contents via a satellite;

a base station to receive contents from the above described satellite and transmit this via wireless (radio wave and light); and reproducing means to implement communication with the above described base station via wireless and receive and reproduce the contents transmitted from the above described base station.

For example, the above described base station comprises means to receive contents transmitted from the above described transmission means via a satellite, means to accumulate the received contents and means to select and transmit any of the above described accumulated contents via the above described wireless LAN.

In addition, the above described base station may comprise means to detect reproducing means which have entered inside the communication area of its own wireless LAN and means to transmit contents to the detected reproducing means.

In addition, the above described base station may comprise designating means to designate reproducing means of a destination of transmission and means for the designated means to transmit contents to reproducing reproducing means. As a means to designate the destination of transmission, there are for example, a method to input an address of the destination of transmission directly, a method to record the address in advance in an ID card, etc. and read this out, and a technique to mutually certify by way of communication so as to proceed with designation, etc.

For example, the above described transmitting means transmits the contents to the base station under an encoded state via a satellite. In this case, a decoding key is desirably transmitted to the base station via route different from that for the above described contents.

For example, the above described base station is brought into connection with the above described transmitting means and comprises means to request transmission of desired contents. In this case, the above described transmission means transmits in accordance with request from the above described base station the requested contents via the above described satellite.

They may further comprise accounting means to record accounting information of each of the above described reproducing means. In this case, for example, the above described base station makes inquiry to the above described accounting means and, in the case where it is notified by the above described accounting means that an accounting process have been finalized, transmits contents to the above described reproducing means while the above described accounting means transmits notification showing whether or not the accounting process have been finalized in reply to inquiry from the above described base station.

In addition, the above described transmitting means and the base station may be connected with a network of terrestrial system different from communication using the above described satellite, and the above described base station may inquire the above described accounting means via the above described network of terrestrial system, and the above described accounting means may be configured to transmit via the above described network of terrestrial system a notification showing whether or not the accounting process is completed toward the inquiry from the above described base station.

The above described base station stores, for example, the contents under encoded state together with the encoding keys. In addition, in the case where the contents are transmitted, the above described reproducing means are certified, and after the above described reproducing means are certified, secret codes of the contents are deciphered, and the present reproducing means encodes the deciphered contents with reproducible technique to transmit. The above described reproduction means desirably store the received contents without decoding. Implementing decoding at the time of reproduction, in this case, reproduction will be implemented.

The above described base station may packet the data to transmit and the apparatus to be mounted on a vehicle may comprise means to receive the data transmitted from the above described base station, confirm the received data, and in the case where a portion thereof suffer from defects, request retransmission of the deciphered data to the above described base station.

In order to attain the above described first objective, a reception-redistribution system related to the second view point of the present invention comprises:

means to receive contents which will arrive by transmission from a satellite;

accumulating means to accumulate the received contents; and means to transmit to a mobile station via wireless network the contents accumulated in the above described accumulating means.

For example, contents transmitted from the above described satellite are encoded, and the above described reception-redistribution system comprises means to receive a decoding key for the above described contents via communication route different from broadcasting.

The above described reception-redistribution system comprises means to receive the code key from equipment as destination of transmission, and the above described receipt-redistribution system comprises means to use decoding key to decode the above described contents and moreover to use the decoding key received from equipment as destination for transmission to implement decoding for transmission.

The above described reception-redistribution system comprises means to designate contents to a transmitter of the contents to request the contents and means to receive the decoding key of the contents from the transmitter of the above described contents in accordance with the request.

Moreover, in order to attain the above described first objective, a contents distribution method related to the third view point of the present invention comprises the steps of:

transmitting contents to a receiving station via satellite from transmitting stations;

receiving the contents at the above described receiving station to transmit this via wireless network; and receiving in a terminal in the vicinity of the above described receiving station the contents transmitted via wireless network to store in storage medium.

The above described receiving station receives the contents transmitted from the above described transmitting station via satellite to accumulate;

the receiving station where accumulation is implemented receives contents, and transmits this via wireless network; and a terminal in the vicinity of the above described receiving station receives the contents transmitted via wireless network.

In order to attain the above described second objective, electric equipment related to the first view point of the present invention is electric equipment which comprises a main body and an operation panel detachably mounted to the above described main body, and the above described operation panel comprises a circuit for controlling a circuit inside the above described main body and acoustic circuit which is operable under a state in which the operation panel is removed from the main body.

According to this configuration, the operation panel is combined with the main body under normal conditions performs its function as operation panel. On the other hand, once it is removed from the main body, it will help preventing the main body from being stolen as well as become a kind of portable audio with acoustic circuit. Therefore, the operation panel can be utilized effectively.

The operation panel, for example, comprises an input portion and an output jack, which the main body comprises an amplifying circuit to drive loud-speaker. In this case, the above described operation panel responds to operation of the above described inputting portion under a condition connected with the above described main body, supplies the output signal of the acoustic circuit to the amplifying circuit inside the above described main body, so as to enable output from the loud-speaker, and responds to operation of the above described inputting portion under a condition separated from the above described main body, outputs outputting signals of the acoustic circuit to the above described output jack.

The above described operation panel and the above described main body, for example, are combined so as to function as a car audio, while the above described operation panel is separated from the above described main body so as to function as a portable audio.

In addition, in order to attain the above described second objective, electric equipment related to the second view point of the present invention, is an electric equipment comprising a main body and an operation panel which is detachably equipped to the main body, and the above described operation panel comprises a circuit to control a circuit inside the above described main body and a control circuit to control an external apparatus remotely in which the above described operation panel can operate under a state of being removed from the main body.

For example, the above described operation panel may be arranged to comprise a wireless communication portion and an input portion, communicate with an external circuit with the above described wireless communication portion and control the external circuit in response to operation of the above described input portion under a state being separated from the above described main body.

Moreover, the above described operation panel and the above described main body may be combined to function as car audio and the above described operation panel be arranged to be separated from the above described main body to function as a remote control apparatus of the external apparatus.

The above described main body and the above described operation panel respectively comprise processors to control internal circuits thereof. Under a state that the above described operation panel being connected with the above described main body, the both processors mutually communicate to operate the above described main body and the above described operation panel as one apparatus, and under a state that the above described operation panel is separated from the above described main body, the processor of the above described operation panel operates independently to control the circuit inside the present operation panel.

The above described main body comprises a power source circuit to provide an internal circuit and the above described operation panel with electric power, and the above described operation panel, which is under a state being supplied with electric power from a secondary cell and the power source circuit of the above described main body, charges the secondary cell with the supplied electric power and supplies the internal circuit with electric power, and under a state that the power supply from the power supply circuit of the above described main body is stopped, supplies the internal circuit with electric power accumulated in the secondary battery.

Moreover, in order to attain the above described second objective, a panel related to a third view point of the present invention is a panel configured to be detachable from a main body, and comprises a circuit to control a circuit inside the above described main body and an acoustic circuit operable under a state that the above described panel is removed from the main body.

The above described panel comprises an input portion and an output jack, and under a state being connected with the above described main body responds to operation of the above described input portion to enable output signals of the acoustic circuit to be outputted from a loud-speaker, and under a state being separated from the above described main body responds to operation of the above described input portion to output the output signals of the acoustic circuit to the above described output jack.

The above described panel is, for example, combined with the above described main body to function as an operation panel of a car audio and is separated from the above described main body to function as a portable audio.

Moreover, in order to attain the above described second objective, a panel related to a fourth view point of the present invention is a panel configured to be detachable from a main body, and comprises a circuit to control a circuit inside the above described main body and a control circuit which is operable under a state that the above described panel is removed from the main body and is to remotely control the external apparatus.

For example, the above described panel comprises a wireless communication portion, and under a state being separated from the above described main body, responds to operation of the above described input portion to communicate with the external circuit with the above described wireless communication portion and control the external circuit.

For example, the above described panel is combined with the above described main body to function as a car audio and is separated from the above described main body to function as a remote control apparatus of the external apparatus.

The above described panel, for example, comprises a processor to control an internal circuit. Under a state that the above described operation panel is connected with the above described main body, the above described processor communicates with the processor inside the above described main body to operate the above described panel as an operation panel of the above described main body, and under a state that the above described panel is separated from the above described main body, operates independently to control the circuit inside the panel.

For example, the above described panel comprises a secondary cell and a power source circuit to supply an internal circuit with electric power and charge the secondary cell with the supplied electric power under a state being supplied with electric power from the power source of the above described main body, and supply the internal circuit with electric power accumulated in the secondary battery under a state that the power supply from the power source of the above described main body is stopped.

In order to attain the above described third objective, a vehicle-mounted electric equipment related to a first view point of the present invention is a vehicle-mounted acoustic equipment comprising a main body and an operation panel equipped to the main body;

the above described operation panel comprises a slot in which a semiconductor memory to store data is equipped detachably and a circuit to access the semiconductor memory equipped to the slot; and the above described main body comprises a circuit to reproduce data read out from the above described semiconductor memory.

In this configuration, the semiconductor memory is disposed in the above described operation panel. The operation panel tends to emit heat more than the main body does. Accordingly, it can operate in an environment better than being disposed in the main body.

In addition, in order to attain the above described third objective, a vehicle-mounted electric equipment related to a second view point of the present invention comprises:

read-out means to access a semiconductor memory to read out data, output means to output the data read out with the above described readout means, measuring means to measure temperature of the above described semiconductor memory, control means to control access of the above described readout means to the above described semiconductor memory in accordance with the temperature which the measuring means measures. This configuration measures temperature of a semiconductor memory and controls access in accordance with the measured temperature. For example, with temperature not less than a reference value, access can be stopped. Accordingly, under a state that operation of a semiconductor memory gets unstable due to heat, such an event that access to the semiconductor memory is prevented can be prevented and highly reliable apparatus can be provided.

The above described temperature measuring means is configured, for example, by a label which is stuck onto a surface of a semiconductor memory and changes reflection rate in accordance with temperature, for example, a label in which a liquid crystal thermometer is formed, and discriminating means to discriminate reflection rate of the above described label.

The above described vehicle-mounted electric equipment comprises, for example, a main body and an operation panel equipped to the main body, and the above described operation panel comprises a slot to which a semiconductor memory storing data is inserted detachably.

It may further comprises notifying means to implement predetermined notification when the temperature measured by the above described temperature measuring means exceeds a reference level.

The above described operation panel is desirably equipped to the above described main body detachably.

In addition, this invention is in particular effective in such a case that at least a portion of the above described main body is contained inside a vehicle and is apt to heating, and the above described operation panel is exposed and operable.

BEST MODE FOR CARRYING OUT THE INVENTION

Embodiments of the present invention will be described as follows based on practical embodiments with reference to drawings.

The present invention is classified into three categories in broad sense from a point of view of its objectives and configurations. In the following portion, the inventions for attaining the above described first, second, and third objectives of the present invention will be referred to as invention I, invention II and III respectively for a purpose of convenience.

Invention I

As follows, an embodiment of a digital contents distribution system related to the present invention I will be described in detail with reference to drawings with a case of music data being distributed as an example.

This digital contents distribution system is a system to transmit in advance musical piece data to a plurality of terrestrial base stations by means of satellite broadcasting, so that the base stations transmit the musical piece data via wireless LAN to an acoustic apparatus mounted on a vehicle and the acoustic apparatus receives and stores in a memory and reproduce the musical piece.

Figure 1:
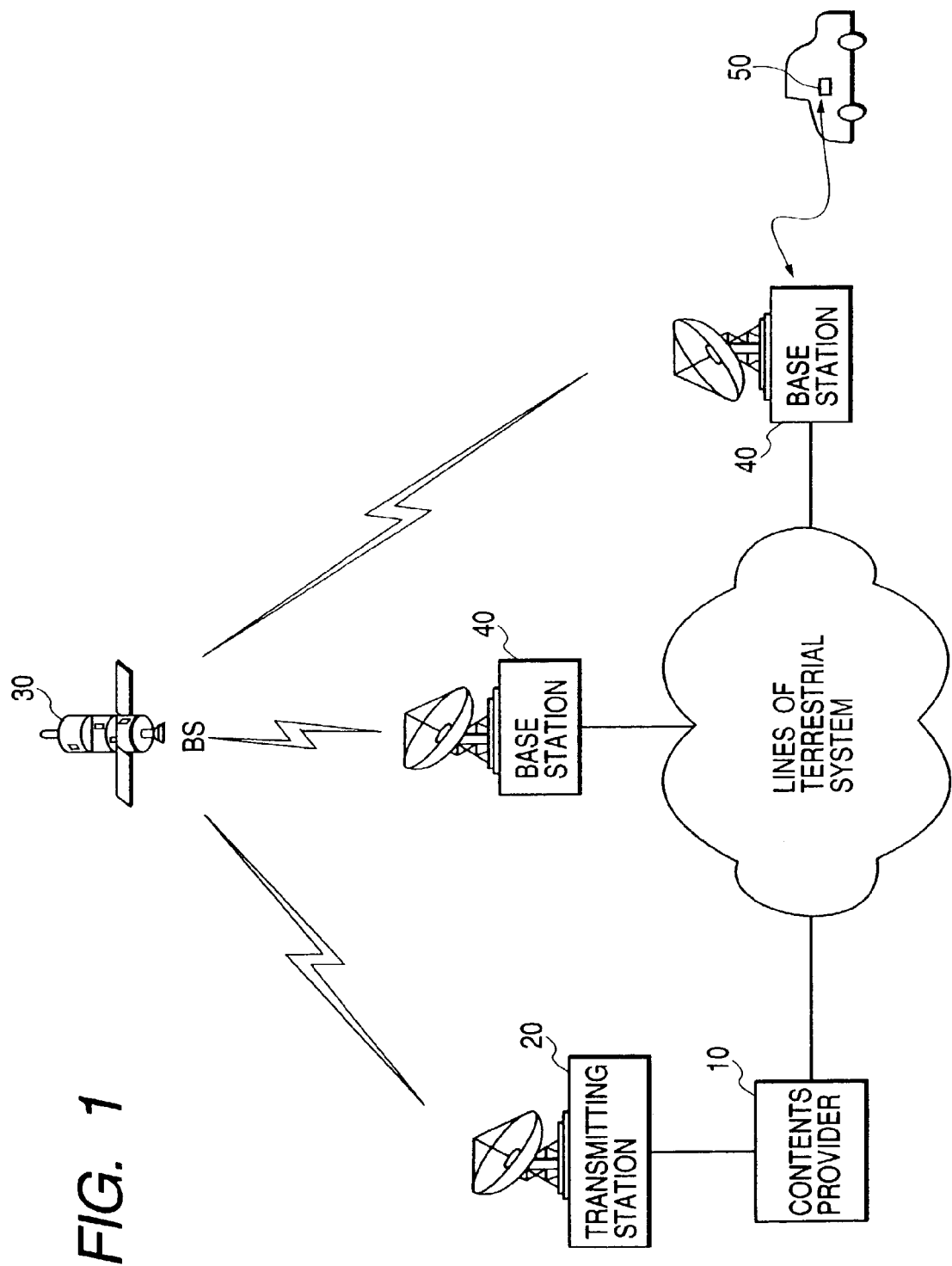
FIG. 1 is a drawing to show an entire configuration of a contents distribution system related to an embodiment of the present invention I.

FIG. 1 shows a configuration of a satellite broadcasting system related to the first embodiment of this invention. As illustrated, this satellite broadcasting system is configured by comprising a contents provider 10, a transmitting station 20, a satellite 30, a plurality of base station 40, and a vehicle-mounted apparatus 50.

The contents provider 10 supplies the transmitter 20 with digital contents (digital music is to be designated in this embodiment) in accordance with a program set in advance.

Figure 2:
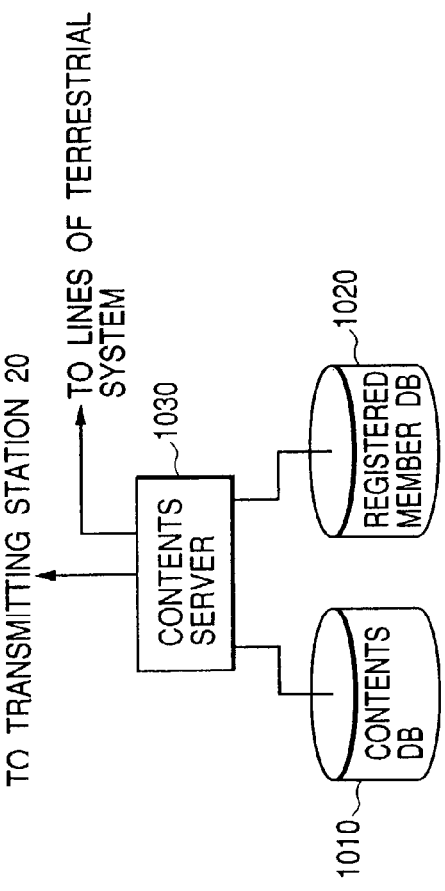
FIG. 2 is a drawing to show a configuration of a contents provider.

Configuration of the contents provider 10 is shown in FIG. 2. As illustrated, the contents provider 10 comprises contents DB (data base) 1010 in which a number of digital contents are accumulated, registered member DB 1020 which stores information on registered users, and contents server 1030.

The contents DB 1010 stores distinguishing code (ID) of a musical piece, title of a musical piece, encoded music data and encoding keys.

The registered member DB 1020 stores members' information such as distinguishing numbers (ID), names, addresses, etc., apparatus ID of equipment which members possess, and charging information.

The contents server 1030 is brought into connection with the contents DB 1010 as well as with the registered member DB 1020 via LAN, with the transmitting station 20 via a dedicated line and moreover with the base station 40 via lines of terrestrial system such as the Internet and public line network (cabled or wireless), etc. The contents server 1030 reads out music data from the contents DB 1010 in accordance with a program (program table) which an individual has set, transmits the music contents under encoded conditions to the transmitting station 20, and transmits the encoding keys to the base station 40 via lines of terrestrial system. In addition, in reply to an inquiry from the base station 40 designating a user, the contents server 1030 notifies the base station 40 of data showing whether or not the user is a registered member.

The transmitting station 20 transmits the music data supplied from the contents server 1030 toward the satellite 30 at a predetermined frequency.

The satellite 30 is a stationary satellite which is called such as BS satellite and CS satellite, etc. and goes around the equator orbit, receives channel signals, for example, Ku band broadcasting signals, etc. which were transmitted from the transmitting station 20 via uplink transmission line, proceeds with frequency conversion into S band to be transmitted inside terrestrial service area via downlink transmission line.

Figure 3:
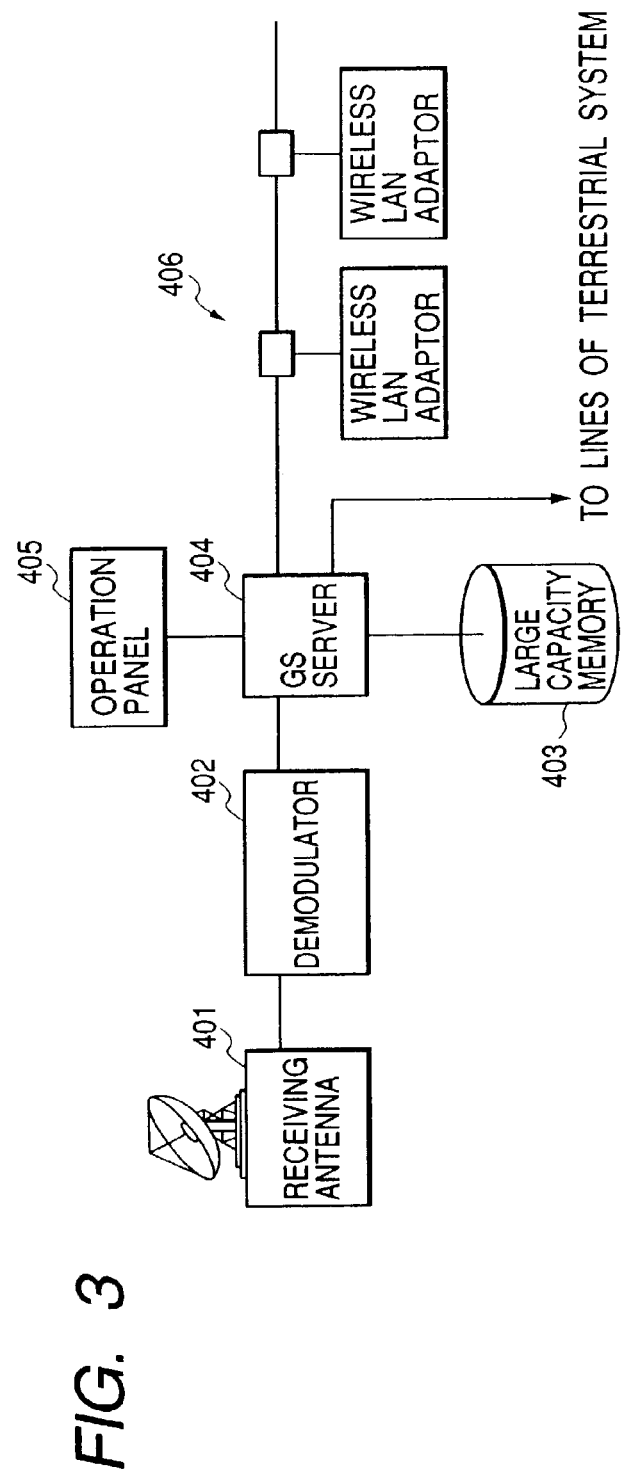
FIG. 3 is a drawing to show a configuration of a base station installed at a gas station, etc.

The base station 40, which is a system which is installed in a gas station (GS) inside a service area of the satellite 30, as shown in FIG. 3 is configured by comprising a receiving antenna 401, a demodulator 402 which demodulates the received signals, a large-capacity memory 403 such as hard disc accumulating the decoded data, a GS server 404, an operation panel 405, and a wireless LAN apparatus 406.

The receiving antenna 401 receives the radio waves transmitted from the satellite 130.

The demodulator 402 demodulates signals that were received with the receiving antenna 401.

The large-capacity memory 403 comprises a hard disc apparatus, etc. to store the music data (which have been encoded) with coding keys being related thereto.

The GS server 404, which is to control operation of the entire base station 40 installed in each gas station, is brought into connection with the demodulator 402 and the lines of terrestrial system such as the Internet. The GS server 404 relates the encoded music data, which have been demodulated by the demodulator 402, to the coding keys to store in the large capacity memory 403. In addition, the GS server 404 responds to instruction from the operation panel 405, inquires the contents provider 10 about accounting information via lines of terrestrial system, and in case of receiving notification that accounting has been completed proceeds with downloading the instructed music data to the vehicle-mounted apparatus 50 via the wireless LAN apparatus 406.

The operation panel 405, which includes a plurality of control keys, etc., makes various instructions to the GS server 404.

A wireless LAN apparatus 406 is configured by comprising a LAN cable brought into connection with the GS server 404 and a wireless LAN adapter brought into connection with the LAN cable via a hub, etc. and configures LAN wirelessly with the vehicle-mounted apparatus 50. Incidentally, media for radio are optional and normal radio waves or lights (for example, IrDa) and Bluetooth, etc. can be utilized.

The vehicle-mounted apparatus 50 is configured by so called car audio, etc., is mounted on a vehicle, etc., receives music data from the base station 40 via wireless LAN, and stores this into a detachable semiconductor memory. Moreover, it is an apparatus for appropriately reproducing the music stored in this semiconductor memory.

Figure 4:
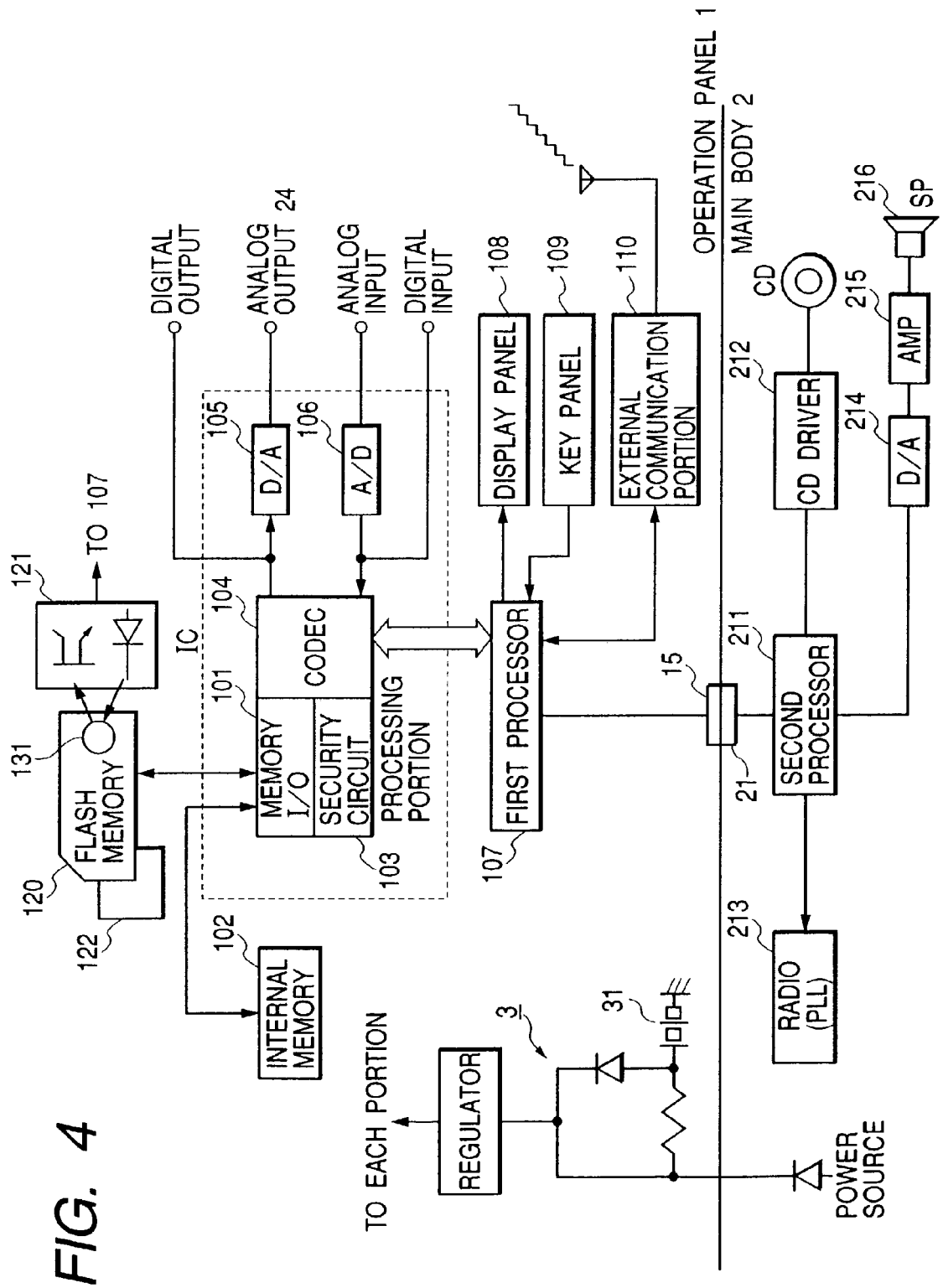
FIG. 4 is a drawing to show a configuration of a vehicle-mounted apparatus.

The vehicle-mounted apparatus 50 comprises as shown in FIG. 4 a memory I/O 101, an internal memory 102, a security circuit 103, a CODEC 104, a D/A 105, an A/D 106, a first microprocessor 507, a display panel 108, a key panel 109, an external communicating portion 10, a second microprocessor 211, a CD driver 212, a radio circuit 213, a D/A 214, an amplifier 215 and a loud-speaker 216.

An external memory 120 configured by comprising rewritable non-volatile memory (flash memory, etc.) is equipped to the memory I/O 101 detachably which writes data into this external memory 120 or reads out the stored data. In addition, the memory I/O 101, which also is connected with the internal memory (flash memory) 102, writes data into the inner memory 102 or reads out stored data.

The internal memory 102 is disposed inside this vehicle-mounted apparatus 50 fixedly and stores this apparatus's own equipment ID in a portion of it.

The security circuit 103 encodes data to be written into the external memory 120 as well as the internal memory 102 and decodes the readout data.

The CODEC 104, which is a compressing/expanding circuit, decodes output data and encodes input data.

The D/A 105 converts the output digital data into analogue signals.

The A/D 106 converts the input analogue signals into digital data.

The first microprocessor 107, which is to control operation of this vehicle-mounted apparatus 50 in its entirety, is configured by comprising a CPU with a built-in ROM which has stored programs.

The display panel 108, which is configured by comprising a liquid crystal display panel or fluorescent display panel, etc., displays various kinds of data.

The key panel 109, which is operated by a user, inputs various kinds of instructions to this vehicle-mounted apparatus 50.

The external communication portion 110 exchanges wireless communication with the base station under control of the first microprocessor 107.

The second microprocessor 211, which is a processor for acoustic control, controls a CD driver 212 and a radio circuit 213 under control of the first microprocessor 507 as well as outputs by releasing reproduced sounds via a loud-speaker 516.

A D/A 214 converts digital data for reproduction which the second microprocessor 511 has outputted into analogue signals.

An amplifier 215 amplifies the analogue signals which the D/A 214 releases sounds via the loud-speaker 216.

Next, operation of the contents distribution system of the above described configuration will be described.

(Music Data Distribution)

At first, processing up to the step to make the large capacity memory 403 of the base station 40 store the music data will be described.

In the contents DB 1010, encoded music data are stored together with their encoding keys.

The contents server 1030 reads out the encoded contents in accordance with the program table prepared in advance and transmits them to the transmitting station 20.

The transmitting station 20 modulates the music data supplied from the contents server 1030, allocates them to a vacant slot and transmits them to the satellite 30 at a predetermined frequency.

The satellite 30 converts the frequency of the transmission signals from the transmitting station 20 and transmits toward the ground.

The base station 40, which is installed at a gas station located inside the area of the satellite 30, receives this with the receiving antenna 401 and demodulates the received signals with the demodulator 402. The GS server 404 stores the demodulated music data into the large capacity memory 403.

On the other hand, the contents server 1030 transmits to each base station 40 via lines of terrestrial system the decoding keys of the transmitted music data. Each base station relates the received decoding keys to the music data and records them into the large capacity memory 403.

For example, the above described processing is repeated at midnight when communication traffic is small the music data are arranged to be stored in the large capacity memory 403 of each base station 40.

(Download of Music Data into Vehicle-Mounted Apparatus)

1) The base station 40, which has been installed at a gas station, transmits periodically from the wireless LAN apparatus 406 to inside the communication area signals inquiring about existence of new vehicle-mounted apparatus (communication terminal) 50 so as to distinguish existence of the new vehicle-mounted apparatus 50.

Suppose, under such circumstances, a vehicle stops by at this gas station.

When the vehicle approaches to the premises of the gas station, the external communicating portion 110 of the vehicle-mounted apparatus 50 detects the wireless signals from the wireless LAN apparatus 406 to notify them to the first microprocessor 107. The first microprocessor 107 transmits the response to the base station 40 via the external communicating portion 110.

This will bring the new vehicle-mounted apparatus 50 into recognition by the base station 40 and thereafter, will enable data communication with the base station 40.

2) In the case where a user of a vehicle which entered the gas station wants to download music data to his own vehicle-mounted apparatus 50, the user visits a web site provided by a contents provider 10 with his own portable terminal (for example a portable phone), to designate the ID of the gas station, the title of the music (or the station code).

The contents server 1030 distinguishes whether or not the caller is a registered member from the telephone number of the calling destination, and judges that he is a registered member, then revise the accounting data for that registered member. For example, if 300 yen will be charged for downloading of one piece of music, the accounting data covering 300 yen will be added. Subsequently, the contents server 1030 transmits the decoding keys to decode the designated music and that user's equipment ID to the GS server 404 of the designated gas station. When the process described above so far is finalized, the contents server 1030 will transmit a message such as "Download is feasible", etc. to the portable terminal.

In response to this message, the user designates a title of music to a person in charge at the gas station to request downloading. The person in charge designates the music from the operation panel 405 and instructs downloading.

Then, the GS server 404 distinguishes whether or not it is in receipt of the decoding keys on the designated music at first. In case of transmission yet to be received, an error is notified.

On the other hand, in case of receipt having been completed, it enters a ready state.

The user operates the key panel 109 to designate the memory (either the internal memory 102 or the external memory 120) at the destination of downloading as well as operates the "download" button. In response to operation of the "download button", the first microprocessor 107 reads out the equipment ID from the internal memory 102 via the security circuit 103 and the memory I/O 101 to transmit it together with the download request command to the base station 40 via the external communicating portion 110.

The GS server 404 of the base station 40 receives the download request command and this equipment ID via the wireless LAN apparatus 406 to decode the designated music data with the decoding keys. Subsequently, the decoded music data is encoded with the received equipment ID. Moreover, the encoded music data is transmitted to the vehicle-mounted apparatus 50 on a packet unit bases via the wireless LAN apparatus 406.

The first processor 107 of the vehicle-mounted apparatus 50 sequentially receives the packets via the external communicating portion 110 and after implementing CRC check, etc., reconstructs the data. The reconstructed data is stored into a designated memory (the internal memory 102 or the external memory 120).

3) There is a case that the music data the user requested is not stored in the large capacity memory 403 of the base station 40. In such a case, the person in charge at the gas station designates the title of music and transmits a request to the contents server 1030. In response to this request, the contents server 1030 transmits the music data to which the address of the base station 40 which has issued a request as the recipient has been attached. The transmitting station 20 broadcasts this music data, and the data arrive at all the base station 40 within the jurisdiction area of the satellite 30, but since specific addresses are set for the recipients, the other base station 40 does not receive this.

On the other hand, the contents server 1030 transmits the decoding keys of the music data to the GS server 404 via lines of terrestrial system. The GS server 404 relates the music data that it received with the receiving antenna 401 and decoded with the decoder 402 to the coding keys that it received via lines of terrestrial system and stores into the large capacity memory 403.

Performance thereafter is the same as that described above.

(Leaving from LAN)

When downloading is completed and the vehicle leaves the gas station, the vehicle-mounted apparatus 50 will no longer become communicable with the wireless LAN apparatus 406. The GS server 404 deletes from a component table the vehicle-mounted apparatus 50 that does not respond to polling for not less than a fixed period, judging that it left the wireless LAN apparatus 406.

(Reproduction of the Downloaded Music Data)

In the case where the user wants to reproduce the downloaded music, the user instructs to display a list of music titles of the music data stored in the internal memory 102 or the external memory 120 with operation of the key panel 109.

In response to this instruction, the first microprocessor 507 makes an access to the internal memory 102 or the external memory 120 via the memory I/O 101 and the security circuit 103 so as to read out the list of music titles equivalent to a table of contents from the TOC (Table of Contents) region and make the display panel 108 to display.

The user selects any music with key operation and designates reproduction.

In response to this instruction, the first microprocessor 107 reads out the designated music data from the internal memory 102 or the external memory 120 via the memory I/O 101, decodes this with the security circuit 103 and moreover decodes (expands) this with the CODEC 104 for output. These data are converted with the D/A 105 into the analogue signals to be outputted to the earphone plugs. Accordingly, the user can listen to the reproduced music with earphones. In addition, it is also possible to extract the digital data outputted from the CODEC 104 without any change from the Digital Out terminal.

Moreover, the reproduced digital data are supplied to the second microprocessor 211 via the first microprocessor 107, appropriately undergo D/A conversion, are amplified and are loudly released from the vehicle-mounted loud-speaker.

As described above so far, according to this embodiment, when a vehicle stops by at a gas station and the like, it can download music data to a vehicle-mounted apparatus from a base station via wireless LAN, and store as well as reproduce it to a storing media. Accordingly no big vehicle-mounted apparatus so as to receive radio waves from a satellite will be necessary, and accumulation of music data will become possible with a compact and light apparatus.

In addition, since the data are collectively transmitted to a plurality of base station 40 from the satellite 30 in a broadcast format, communication costs can be suppressed. In addition, the decoding keys are transmitted to each GS server 404 via lines of terrestrial system of another route different from broadcasting, such an event that the encoding keys are spilled and the music data are illegally decoded can be prevented.

In addition, to each GS server 404, the music data can be transmitted in a patch format mainly during time band when traffic is not heavy such as midnight.

This invention will not be limited to the above described embodiment, and various kinds of variations as well as applications are possible.

For example, in the above described embodiment, when downloading is implemented, accounting process is implemented each time, but pre-paid system may be adopted so that a predetermined charge is paid in advance and an appropriate frequency is purchased and then is set off for each downloading until this frequency reaches zero.

In this case, for example, the prepaid card is purchased at a gas station. In this prepaid card, a card ID and a password lead out from that card ID with a special calculating equation are stored. In the charging database of the contents provider, this ID, the password, and the frequency value are registered in advanced. The user inputs this ID and the password on an input form on the web site provided by the contents DB. The contents provider examines the inputted ID and the password, recognizes them as correct and then accepts a request for downloading. In addition, every time one piece of music is downloaded, predetermined values are subtracted, and downloading is accepted until the frequency value reaches zero.

In addition, unlimited times of downloading may be authorized for monthly or annual payment of a fixed amount. In this case, at the time when it is judged whether or not downloading is authorized, only thing to do is to determine whether or not the charges are paid.

Incidentally, the above described base station is not limited to a gas station, but can be installed at various sites. For example, it is preferably installed in an area where vehicles stop comparatively at a higher rate, such as a convenience store, a family restaurant, a car shop, and a service area, etc. within the service area of the satellite 30.

In the above described embodiment, the case where the base station is disposed at an adjacent gas station will give rise to a problem that the vehicle-mounted apparatus should communicate with which base station.

In this case, it will be reasonable that communication with each vehicle is implemented, for example, when that vehicle is in its own premises. Therefore, for example, a position detecting apparatus configured as shown in FIG. 5 is disposed so that the position of a vehicle is distinguished, and if the distinguished position is inside its own premises, communication is implemented.

Figure 5:
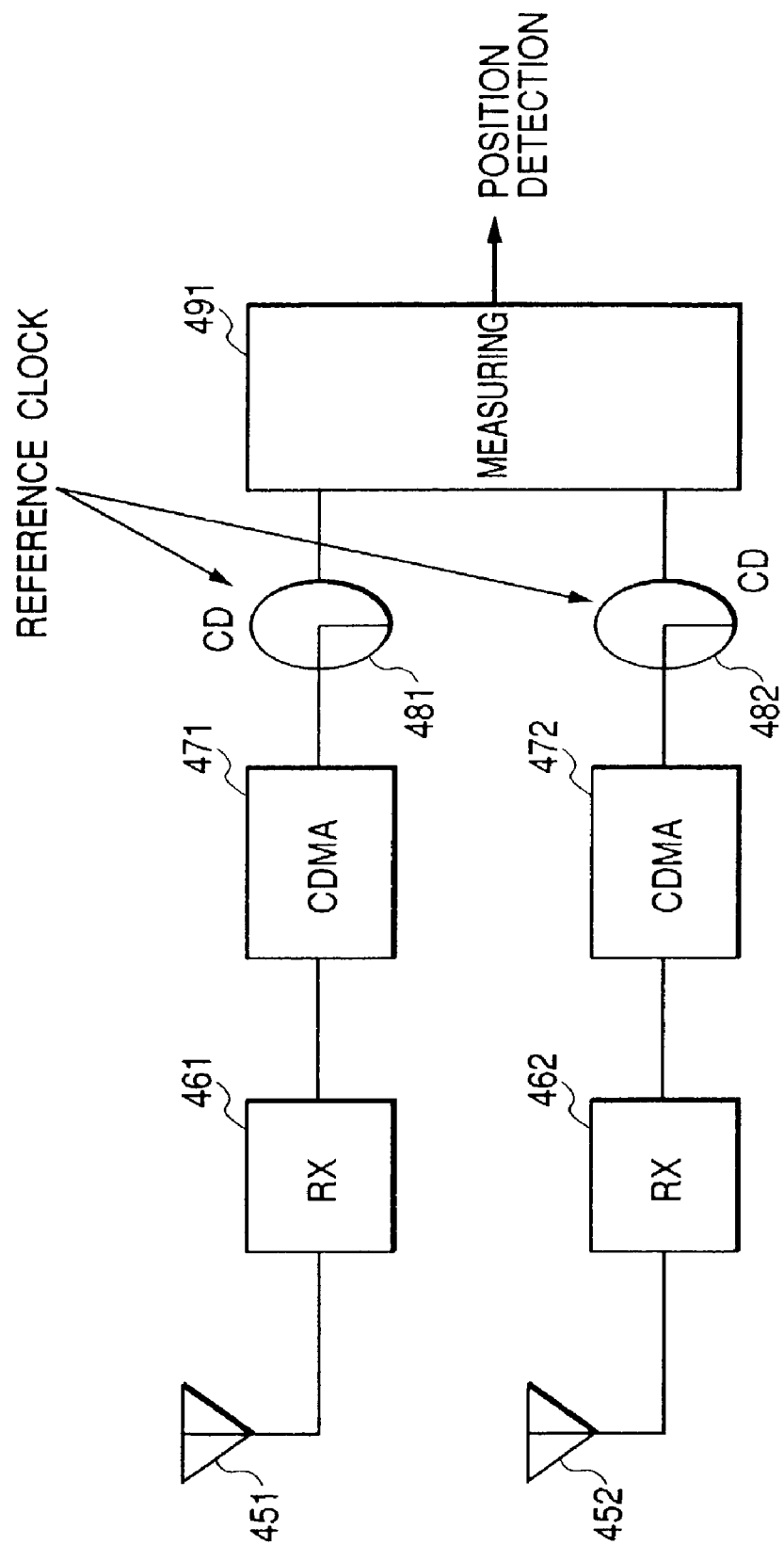
FIG. 5 is a drawing to show an example of a configuration for detecting a position of a vehicle-mounted apparatus.

The configuration shown in FIG. 5 comprises a pair of antennas 451 and 452 disposed at a fixed distance, a pair of high frequency circuits 461 and 462, a pair of CDMA demodulators 471 and 472, phase comparators 481 and 482 and time difference measuring circuit 491.

The radio wave emitted from the vehicle-mounted apparatus 50 is received by a pair of antennas 451 and 452, and is converted into a medium frequency by a pair of high frequency circuits 461 and 462 respectively. Subsequently, phase modulated signals are demodulated with CDMA demodulators 471 and 472.

The phase comparators 481 and 482 respectively give phase difference between the reference clock and the demodulated signals. Finally, time difference measuring circuit 491 gives time difference between signals outputted from the both systems, and from this time difference the position of the vehicle (vehicle-mounted apparatus) can be specified. In addition, the specified position communicates only with the vehicle-mounted apparatus 50 inside the its own premises so that a plurality of adjacent base station 40 can be prevented from an event to communicate with one vehicle.

Incidentally, the vehicle-mounted apparatus 50 may be arranged to transmit signals to specify one of adjacent base station 40 so that only the specified base station 40 communicates with the vehicle-mounted apparatus 50.

Figure 6:
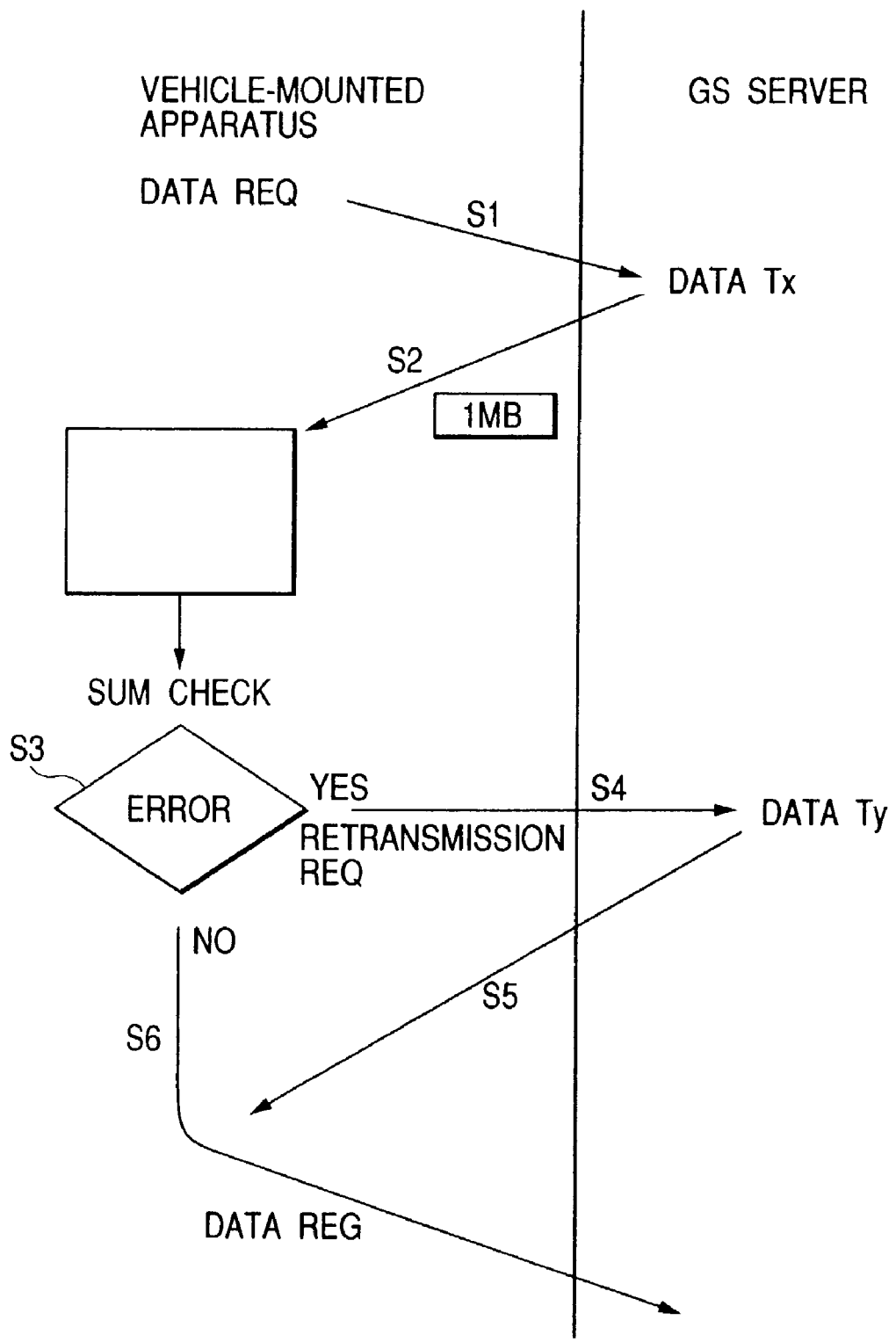
FIG. 6 is a drawing to show an example of a packet transmission procedure.

The mobile communication may happen to lack a portion of communication information. For a normal conversation, etc., lack of a portion of data will not become a serious problem. But, in the case of distribution of digital contents such as music data, etc. based on accounting, even lack of a portion will become a big problem. Therefore, as follows, performance in the case where lack of data takes place will be described with reference to FIG. 6.

At first, from the vehicle-mounted apparatus 5, a request that music data should be downloaded is made (S1). In reply to this request, the GS server 404 attaches a check thumb onto the data to be transmitted so that data for one packet, for example, data of 1 MB are created and are transmitted (S2). The first microprocessor 507 of the vehicle-mounted apparatus 50 implements thumb check on the received data (S3). Here, in the case where an error is detected, normally the error bit is corrected. However, in this embodiment, retransmission is requested to the GS server 404 (S4). In reply to this request, the GS server 404 retransmits the data (S5).

On the other hand, in the case where the data is distinguished to be normal as a result of thumb check, transmission of data for subsequent one packet is requested to the GS server 404 (S6).

Thereafter, similar operation is repeated.

(Second Embodiment)

Next, a second embodiment of this invention will be described.

Figure 7:
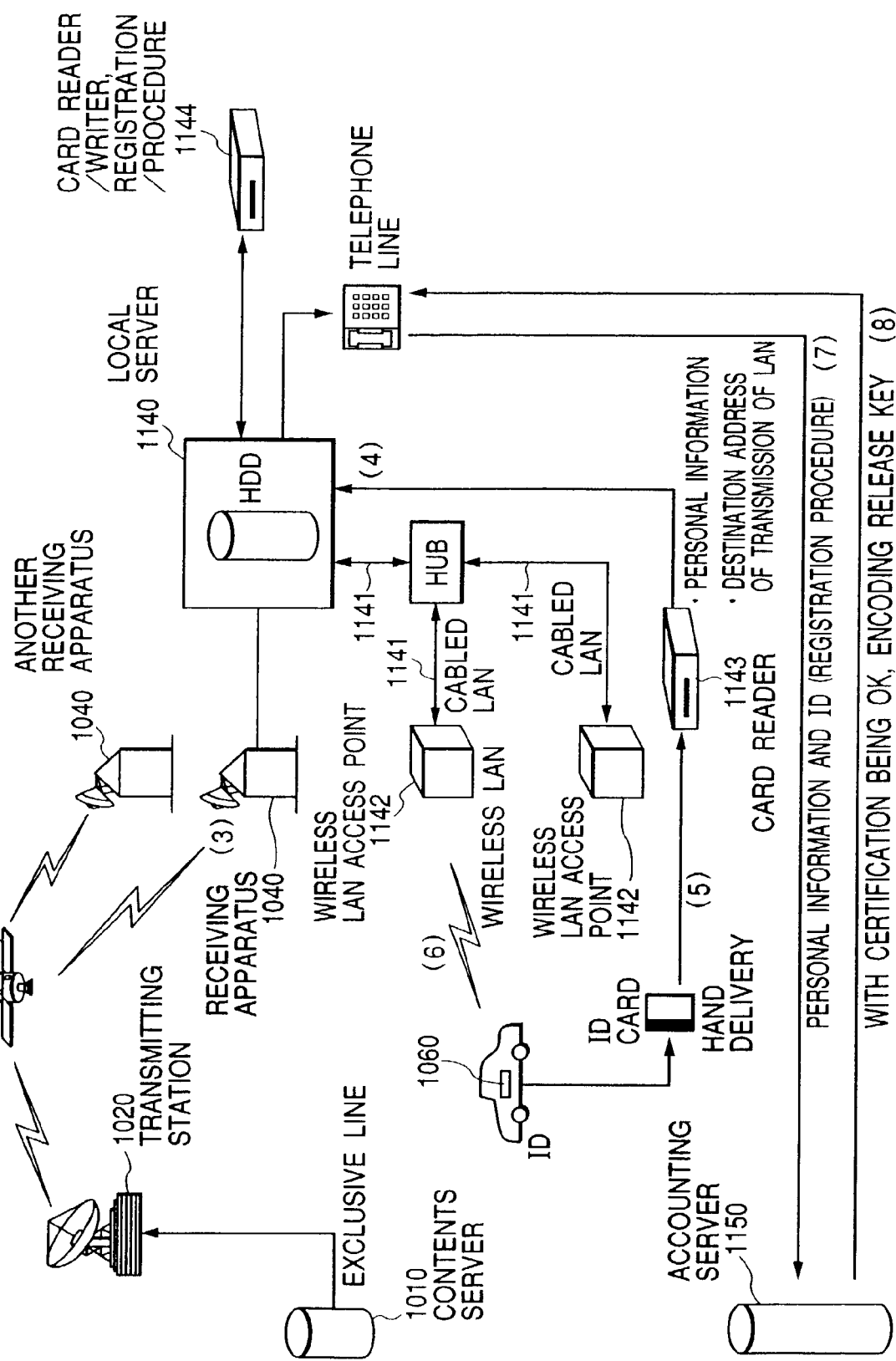
FIG. 7 is a drawing to shown an entire configuration of a contents distribution system related to a second embodiment of the present invention I.

FIG. 7 shows a configuration of a contents distribution system related to the second embodiment of this invention.

As illustrated, this distribution system is configured by comprising a contents server 1010A, a transmitting station 1020A, a satellite 1030A, a plurality of receiving apparatus (base station) 1040, an accounting server 1050, and a vehicle-mounted apparatus 1060.

The contents server 1010A compresses, moreover encodes and stores already transmitted or to be transmitted in the near future. The contents server 1010A transmits (broadcasts) the contents to be transmitted to each receiving apparatus 1040 via the transmitting station 1020 as well as the satellite 1030 during vacant time band such as from midnight/early morning (for example, 1 to 4 a.m.), etc.

Each receiving apparatus 1040 comprises a local server 1140. The local server 1140 comprises a large capacity storing media such as a hard disc HDD to accumulate the received contents (compressed and encoded ones).

A cabled LAN 1141 is connected with the local server 1140 and the access point 1142 of the wireless LAN is connected with the cabled LAN 1141. Moreover a reader/writers 1143 and 1144, which are to read out data stored in the ID card or to write data in the ID card, are connected with the local server 1140. Moreover, the local server 1140 is connected with an accounting server 1050 via pay phone lines.

Next, a method to distribute the contents with a distribution system configured as shown in FIG. 7 will be described.

The contents server 1010A compresses, moreover encodes and stores already transmitted or to be transmitted in the near future. The contents server 1010A transmits (broadcasts) the contents to be transmitted to each receiving apparatus 1060 via the satellite 1030 during vacant time band such as midnight, etc.

Each receiving apparatus 1040 accumulates the contents (compressed and encoded ones) which arrive by transmission via the satellite 1030A into the hard disc HDD inside the local server 1140.

In the case where the music data are downloaded to the user's own reproducing apparatus from the local server 1140, the user proceeds with membership registration so as to get an ID card issued. Into this ID card, the unique ID number and personal information as well as accounting information is registered. The same information is also registered into the accounting server 1050. Moreover, in the ID card, information (address information) to specify the vehicle-mounted apparatus 1060 is set.

In the scene of downloading the music data, the user specifies a music that he/she would like to download and gives his/her own ID card to a person in charge at the gas station. The person in charge mounts the ID card onto the reader/writer 1143 and inputs the specified music to the local server 1140.

The local server 1140 reads out the stored information of the ID card via the reader/writer 1143, and transmits, among the readout information the ID information, the remaining balance information, and title of music (or music code) to the accounting server 1050 via telephone line.

The accounting server 1050 compares the received information with the information that is registered in it for confirmation whether or not the received ID information is valid, and if valid, transmits to the local server the code release key to release the code of the specified music.

The local server 1140 uses the received code releasing key to decode the music data and moreover encodes this with ID of the vehicle-mounted apparatus 1060. In addition, based on the information read out from the ID card, the address of destination of transmission of LAN is designated and transmitted to the vehicle-mounted apparatus 1060. The vehicle-mounted apparatus 1060 can store the received music data into a storing media for reproduction as in the first embodiment.

The user charges (remits) a certain amount to the ID card at any gas station. The local server 1140 notifies the accounting server of the ID information and the remitted amount (which may be either a certain amount or an optional amount). The accounting server 1050 implements process of adding the notified amount of money to the remaining balance.

According to this system, identification can be confirmed easily and the destination of transmission of the music data can be specified easily.

Incidentally, the ID card may be arranged to carry the charging information, or the accounting server may be arranged to carry the charging information. For example, the ID card may be arranged to record the ID information only, and to restore the accounting information on the accounting server for each downloading. Or only the ID card may be arranged to carry the charging information, and this information may be arranged to permit downloading only in the case where downloadable balance amount remains. From the viewpoint of preventing wrong doings, some accounting information is preferably registered in the accounting server 1050.

So far, the first and the second embodiments of this invention have been described, but this invention will not be limited to the above described embodiments.

For example, in the above described embodiments, as storing media, an example to use a semiconductor storing device (flash memory) has been shown, but the storing media are optional. For example, MD, MO, and CD-R, etc. will work.

In the first embodiment, the music data that are not accumulated in the large capacity memory 403 of the base station 40 are transmitted from the contents provider 10 in a broadcasting system, but may be transmitted via lines of terrestrial system.

In the above described embodiments, as downloadable contents an example of music data has been shown, but for example, the present invention is applicable to cases where various digital contents data are distributed such as in the case where map data for car navigation are downloaded, etc., for example.

Figure 8:
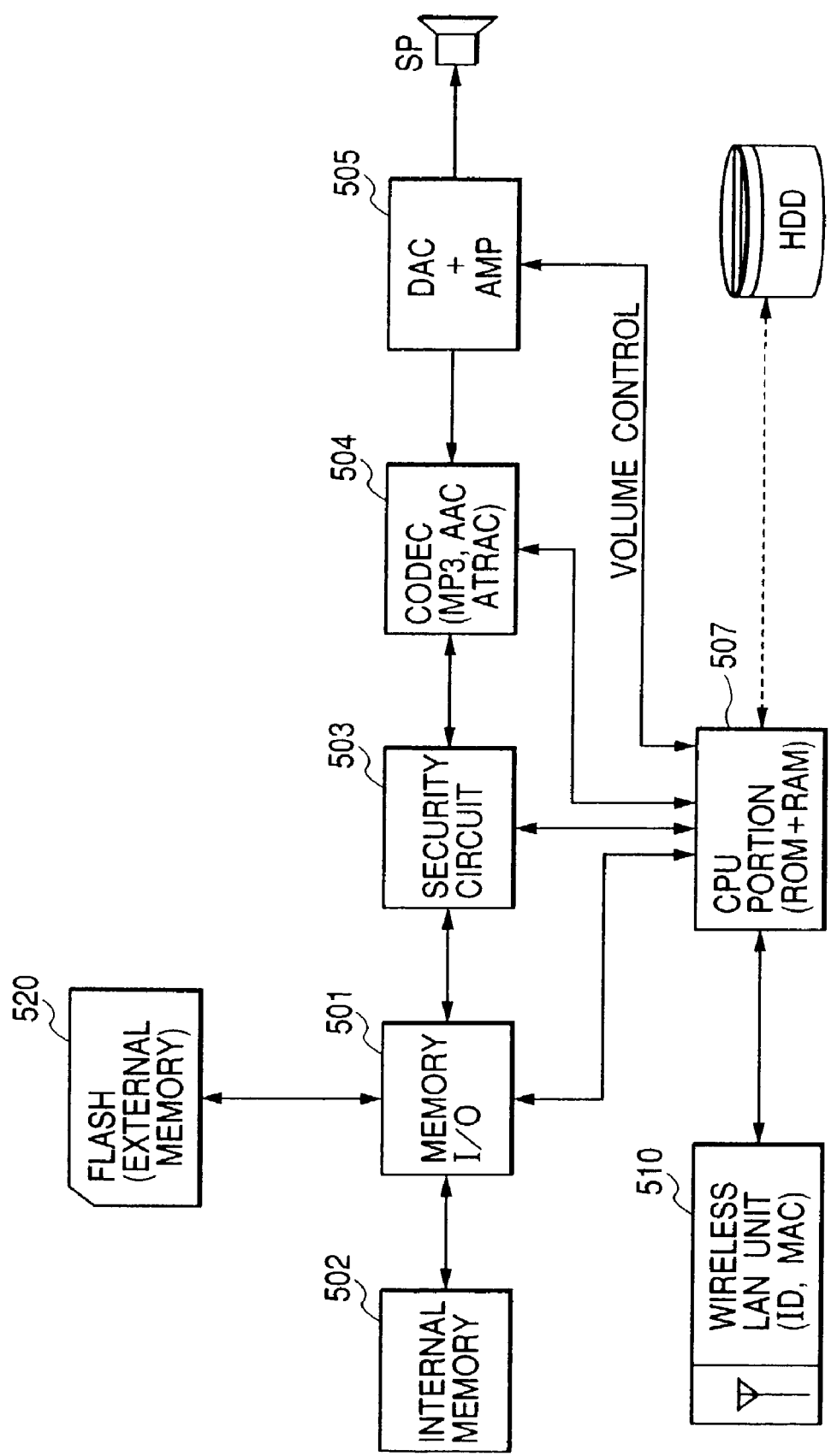
FIG. 8 is a drawing to show another example of a configuration of the vehicle-mounted apparatus.

In addition, the above described system configuration or circuit configuration are just exemplifying and the present invention will not be limited to them. For example, the configuration of vehicle-mounted apparatus shown in FIG. 4 is a configuration based on a conventional car audio, but for example, as shown in FIG. 8, a semiconductor memory and a magnetic disc may be configured to be as a main storing media.

In addition, a technique to designating contents, a technique to encoding the contents, and a technique to decoding are optionally selectable. For example, as a technique to designate the contents to be downloaded, a technique taking a vehicle-mounted apparatus with limited display area and limited number of keys into consideration has been described, but in the case where a display panel 108 with a comparatively large screen and a key panel 109 comprising a number of keys can be secured, it is naturally possible to implement wireless communication between the vehicle-mounted apparatus 50 and the base station 40 so as to directly designate a music that the user would like to download and to implement the charging processing.

Invention II

A practical embodiment of vehicle-mounted electric equipment related to the present invention II will be described with reference to drawings.

Figure 9:
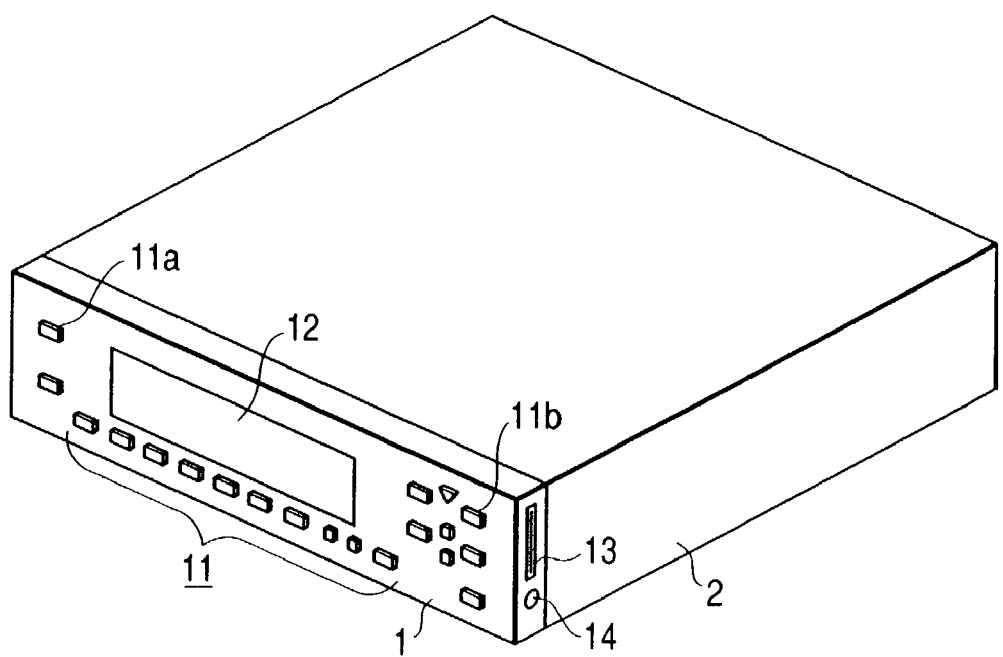
FIG. 9 is a perspective view showing appearance of combined state of vehicle electronic equipment related to an embodiment of the present invention II.
Figure 10:
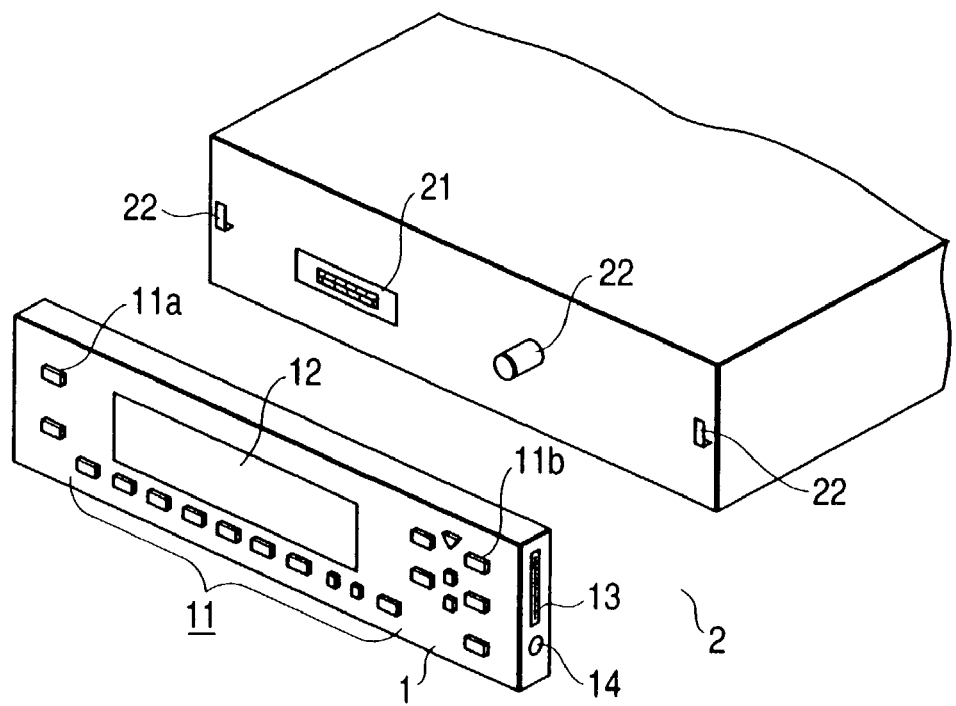
FIG. 10 is a perspective view showing appearance of separated state of vehicle electronic equipment related to an embodiment of the present invention II.

FIG. 9 is a perspective view showing appearance of combined state of the vehicle-mounted electric equipment (car audio) applied to an embodiment of this invention, and FIG. 10 is a perspective view showing appearance of a separated state.

The vehicle-mounted electric equipment shown in FIG. 9 is an equipment which can reproduce a storing media such as CD (compact disc), etc., and is configured by comprising a operating panel 1 and a main body 2.

An operation panel 1 comprises a plurality of operation keys 11, a display unit 12, a memory slot 13, an output jack (earphone terminal) 14 and a connecting terminal portion (on the rear face).

The operation keys 11 comprise push buttons, etc. Incidentally, the operation keys 11 includes a removing key 11a to remove the operation panel 1, and an ejection key 11b to eject the storing media mounted onto the memory slot 13.

The display unit 12 comprises fluorescent display tube and a liquid crystal display panel, etc.

The memory slot 13 is formed on the side face of the operation panel 1, and rewritable semiconductor storing media comprising such as a flash memory, etc. is mounted detachably thereto. Pushing operation of the eject button 11b ejects the semiconductor storing media.

The output jack 14 is formed on a side surface of the operation panel 1, and outputs audio signals with small power.

The connection terminal portion is disposed on the rear surface of the operation panel 1 and is connected with the connection terminal 21 of the main body 2 and electrically connects the circuit inside this operation panel 1 with the circuit inside the main body 2.

The main body 2 contains a CD (compact disc) driver and circuits with comparatively large power consumption such as a large capacity amplifier, etc., and comprises a connecting terminal 21 and a storing mechanism 22 on the front surface to detachably hold the operation panel 1 disposed on the front surface. The configuration itself of the holding mechanism 22 is optional, and a configuration disclosed in for example Japanese Laid Open Gazette No. 6-252565 can be utilized.

This vehicle-mounted apparatus comprises as shown in FIG. 4 a memory I/O 101, an internal memory 102, a security circuit 103, a CODEC 104, a D/A 105, an A/D 106, a first processor 107, a display panel 108, a key panel 109, an external communicating portion 110, a second processor 211, a CD driver 212, a radio circuit 213, a D/A 214, an amplifier 215 and a loud-speaker 216.

Among them, the a memory I/O 101, the internal memory 102, the security circuit 103, the CODEC 104, the D/A 105, the A/D 106, the first processor 107, the display panel 108, the key panel 109, and the external communicating portion 110 are disposed inside the operation panel 1.

In addition, the second processor 211, the CD driver 212, the radio circuit 213, the D/A 214, and the amplifier 215 are disposed in the main body 2.

The both apparatus 1 and 2 are mutually connected with the terminals 15 and 21.

An external memory (rewritable type memory: flash memory) 120 inserted into the memory slot 13 is detachably equipped to the memory I/O 101 which writes data into this external memory 120 or reads out the stored data. In addition, the memory I/O 101, which also is connected with the internal memory (flash memory) 102, writes music data and image data into the inner memory 102 or reads out the above described stored data.

The internal memory 102 is disposed inside this vehicle-mounted electric equipment fixedly and is configured by comprising backed-up RAM and a flash memory, etc.

The security circuit 103 encodes data to be written into the flash memory 120 as well as the internal memory 102 with encoding keys and decodes the readout data.

The CODEC 104 is a compressing/expanding circuit to decode output data and encodes input data.

The D/A 105 is a circuit to convert the output digital data into analogue signals.

The A/D 106 is a circuit to convert the input analogue signals into digital data.

The first microprocessor 107, which is to control operation of this vehicle-mounted electric equipment in its entirety (in particular the operation inside the operation panel 1), is configured by comprising a CPU with a built-in ROM which has stored programs.

The external communication portion 110 exchanges wireless communication with small power consumption with the base station under control of the first processor 107. Incidentally, the communication media are not limited to radio waves, and lights (for example, IrDa in case of infrared rays), etc. will do. Or, Bluetooth, etc. will also work.

The second processor 211 is a processor to control circuits and their operation inside the main body 2 and implements communication with the first processor 107, and controls a CD driver 212 and a radio circuit 213 as well as outputs by releasing reproduced sounds via a loud-speaker 216.

A D/A 214 converts digital data for reproduction which the second processor 211 has outputted into analogue signals.

An amplifier 215 amplifies the analogue signals which the D/A 214 and releases sounds via the loud-speaker 216.

The panel 1 and the main body 2 comprise a power source apparatus 3. The power source apparatus 3 supplies electric power to the panel 1 from the main body 2 under the state that the panel 1 is connected with the main body 2 and at the same time charges the secondary cell 31 while supplying electric power to the circuit inside the panel 1 with the secondary cell under the sate that the panel 1 has been removed from the main body 2.

Next operation of this vehicle-mounted electric equipment will be described.

This apparatus operates approximately same as normal car audio under the circuitry condition shown in FIG. 4.

For example, suppose a user operates the operation keys 11 and instructs reproduction of CD (compact disc).

In replay to this instruction, the first processor 107 instructs the second processor 211 for reproduction. The second processor 211 proceeds with control (tracking servo, focus servo, spindle servo, and sled servo, etc.) on the CD drive apparatus (driver) 212 to reproduce music data, etc. from the CD.

The second processor 211 supplies music data (PCMA) among reproduced data to the D/A 214 for conversion to analogue signals, and amplifies this to a level which the volume instructs with the power amplifier 215 for outputting from the loud-speaker 216.

In addition, the second processor 211 supplies the reproduction data to the first processor 107. The first processor 107 arranges the text data among reproduced data to be displayed on the display panel 108 and supplies the music data to the CODEC 104. The CODEC circuit 104 decodes the supplied music data and supplies them to the analogue output terminal (that is, the earphone jack) 24 via the D/A 105. Accordingly the user can also listen to music with a headphone and an earphone, etc.

In addition, in the case where recording is designated, the first processor 107 encodes and compresses the music data with the security circuit 103 and stores them into the external memory 120 or the internal memory 102 via the memory I/O 101.

In addition, suppose the user operates the operation keys 11 to instruct reproduction into the flash memory 120.

In response to this instruction, the first processor 107, the first processor 107 reads out the music data of the instructed music from the internal memory 102 or the external memory 120 via the memory I/O 101 and the security circuit 103. These data are decoded with the CODEC 104 for outputting. These output data are converted into analog signals with the D/A 105 to be outputted to the earphone plug 24. In addition, the digital data outputted front the CODEC 104 can be extracted to outside without any change from the Digital Out terminal.

The reproduced digital data are supplied to the second processor 211 via the first processor 107, converted into analog signals with the D/A 214, amplified with the amplifier 215 and are loudly released from the loud-speaker 216.

Next, suppose the user operates the operation keys 11 and instructs external communication.

In response to this instruction, the first processor 107 controls the external communication porting 110 so as to wirelessly transmit to outside via the outside communication portion 110 the reproduced data from the storing media, the input data from Digital In and Analog In or the output from a radio, or so as to receive data from outside with the outside communication portion 110 and supplies them to the first processor 107.

The operation panel 1 is removable from the main body 2 in order to prevent this vehicle-mounted electric equipment from being stolen at the time of parking vehicles and the like. When the operation panel 1 is removed, the main body 2 stops its operation.

On the other hand, the operation panel 1 is carried by the user and continues its operation with electric power of the secondary cell 31.

For example, suppose the user operates the operation keys 11 while carrying the operation panel 1, and instructs reproduction of the internal memory 102 or the external memory 120. In response to this instruction, the first processor 107 reads out the designated music data from the internal memory 102 or the external memory 120 via the memory I/O 101 and the security circuit 103. Moreover, these data are decoded with the CODEC 104 for output. These data are converted with the D/A 105 into the analogue signals to be outputted to the earphone plug 24.

In addition, suppose that the user operates the operation keys 11 and instructs processing to store to the internal memory 102 or the external memory 120 the signals supplied to the analogue input terminal. In response to this instruction, the first processor 107 converts the input analogue signal to the digital signals with the A/D 106, codes them with the CODEC circuit 104, and moreover, encodes them with the security circuit 103 to store them in the internal memory 102 or the external memory 120 via the memory I/O 101.

Moreover, suppose that the user instructs processing to bring in the data with wireless communication to store in the internal memory 102 or the external memory 120. In response to this instruction, the first processor 107 receives signals from outside with the external communication portion 110, demodulates them, codes them with the CODEC 104, and moreover, encodes them with the security circuit 103, and stores them in the internal memory 102 or the external memory 120 via the memory I/O 101.

Thus, the operation panel 1 implements only operation with comparatively small power consumption under the state that the operation panel 1 is removed from the main body 2. Accordingly, in spite that it operates only with the secondary cell 31, it can operate for a long. Accordingly, according to this embodiment, the operation panel 1 of a vehicle-mounted electric equipment can be used as a operation panel for the entire car audio under a normal state and as a small/portable type audio under a state of being removed from the main body 2. Accordingly, it will become possible to prevent the car audio from being stolen and enjoy music.

Incidentally, this invention will not be limited to the above described embodiment, and various kinds of variations as well as applications are possible. For example, the external communication portion 110 consumes comparatively large electric power. Accordingly, the external communication portion 110 may be disposed in the main body 2. In addition, among operations of the external communication portion 110, transmissions consuming a large electric power may be prohibited while only reception may be made feasible.

The appearance configuration or circuit configuration related to the present invention II shown in the above described embodiment is just an example, and a change may be made appropriately. For example, the main body is not limited to a CD, and otherwise MD (minidisk), MO (Magneto-Optical disk), DVD-RAM (Digital Video Disc-RAM), etc. may be disposed. However, such apparatus comprises driving portion such as rotary driving portion, etc., and consumes comparatively a large electric power. Accordingly, they are not disposed in the operation panel 1, but disposed in inside the main body 2.

In addition, the above described embodiment has been exemplified by a car audio, but is likewise applicable to the electric equipment in which the panel is removable. For example, a similar function may be attached to the controller of a car navigation apparatus.

Moreover, the above described embodiment has been exemplified with the operation panel 1 which is used as a portable acoustic equipment, but may be used as a remote controller. That is, as an operation program for the first processor 107, a control program on each kind of external apparatus may be installed in advance so that it can communicate with the equipment for controlling via the wireless communicating portion 110 to control the equipment for controlling.

In this case, the operation keys 11 as well as the key panel 109 function as input apparatus to give instructions to the external equipments via the first processor 107 and the external communication portion 110. In addition, the display panel 108 functions as a monitor apparatus, etc. for displaying GUI to input the control commands or displaying operation states of the equipment in question.

The electric equipment configured as described above is suitable for storing in the semiconductor memory 102 or 120 the contents distributed with the contents distribution system related to the above described invention I, carrying the panel 1, and reproducing.

Invention III

A practical embodiment of the present invention III will be described with reference to drawings as follows.

This invention is applied to the vehicle-mounted electric equipment related to the invention II, appearance of which is shown in FIG. 9.

As described above, this vehicle-mounted electric equipment related to the invention II is an equipment which can reproduce a storing media such as CD (compact disc), etc., and is configured by comprising a operating panel 1 and a main body 2.

This vehicle-mounted apparatus comprises, as described with respect to the present invention II, as shown in FIG. 4 a memory I/O 101, an internal memory 102, a security circuit 103, a CODEC 104, a D/A 105, an A/D 106, a first processor 107, a display panel 108, a key panel 109, an external communicating portion 110, a second processor 211, a CD driver 212, a radio circuit 213, a D/A 214, an amplifier 215 and a loud-speaker 216.

Moreover, vehicle-mounted apparatus comprises an optical sensor 121 and an automatic emitting mechanism 122.

Among them, the a memory I/O 101, the internal memory 102, the security circuit 103, the CODEC 104, the D/A 105, the A/D 106, the first processor 107, the display panel 108, the key panel 109, the external communicating portion 110, the optical sensor 121 and the automatic emitting mechanism 122 are disposed inside the operation panel 1.

An external memory (rewritable type memory: flash memory) 120 inserted into the memory slot 13 is detachably equipped to the memory I/O 101 which writes data such as music data and image data, etc. into this external memory 120 or reads out the above described data. In addition, the memory I/O 101, which also is connected with the internal memory (flash memory) 102, writes music data and image data into the inner memory 102 or reads out the above described stored data.

Figure 11:
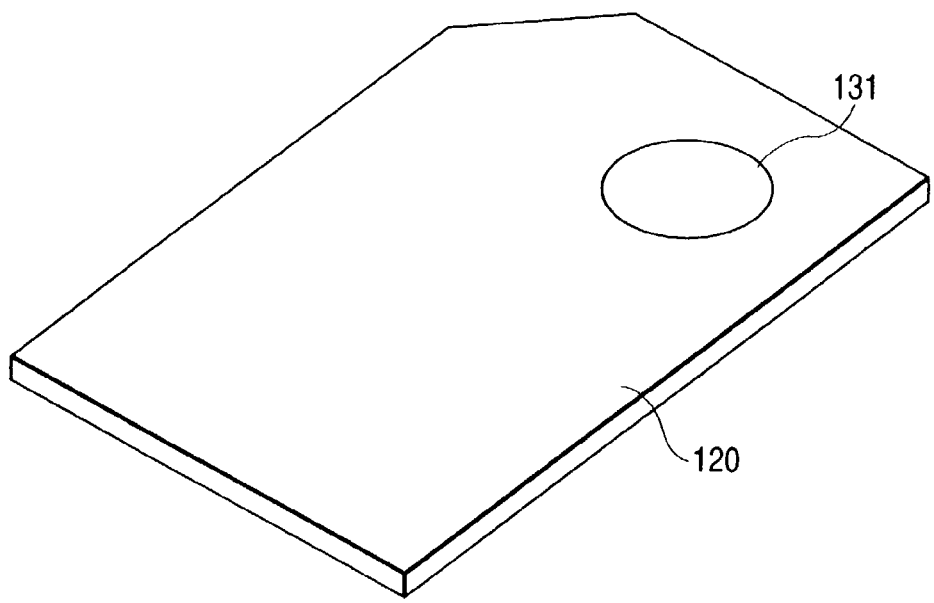
FIG. 11 is a drawing to show an example of an external memory onto which a label is stuck.

The external memory 120 is a rewritable type memory (for example, flash memory) to be inserted detachably to the memory slot 13. As shown in FIG. 11, on its surface reflection rate changes in accordance with temperature. In other words, a label 131 which changes its color (chroma and color level) is stuck thereon. This label 131 is configured by comprising, for example, a liquid crystal thermometer, etc.

The optical sensor 121 radiates lights from light-emitting diode, etc. onto the label 131 stuck on to the external memory 120 equipped to the memory slot 13, detects intensity of the reflected light thereof with an optical transistor to obtain their ratio Idetect/Iout, that is, the reflection rate. The Idetect/Iout changes in accordance with temperature as shown in FIG. 12.

Figure 12:
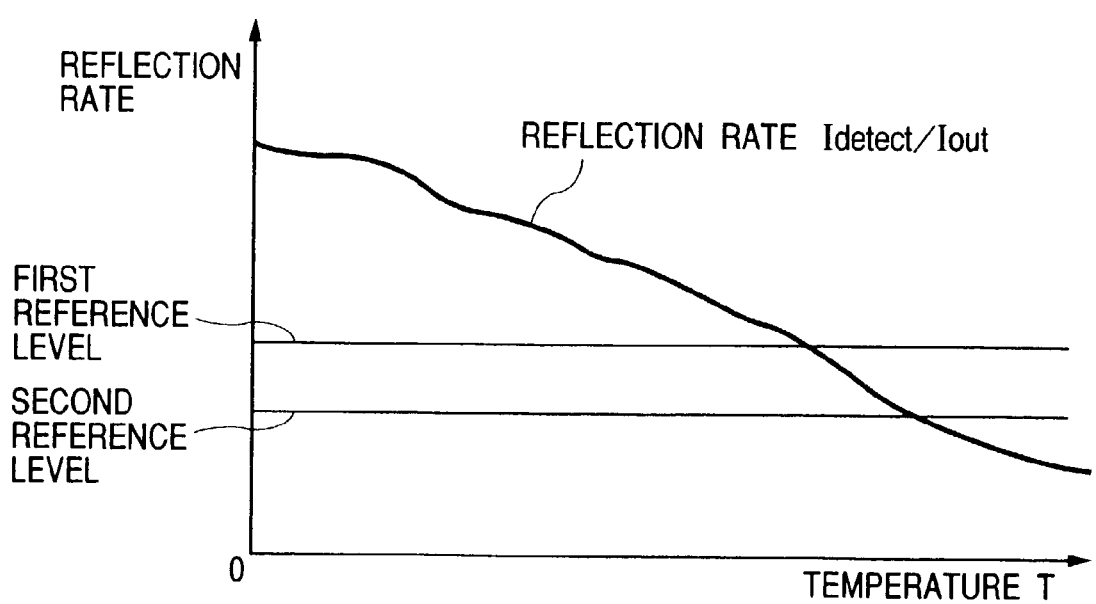
FIG. 12 is a drawing to show relationship between temperature and reflection rate of a label struck onto an external memory as well as reference levels determined based on temperature characteristic of an external memory.

The automatic expelling mechanism 122 expels in an involuntary fashion the external memory 120 at the point of time when, in FIG. 12, the temperature reaches the second reference level (the temperature immediately before a danger that the stored data of the external memory are destructed takes place) in accordance with instruction from the first processor 107.

The operation panel 1 implements only operation with comparatively small power consumption under the state that the operation panel 1 is removed from the main body 2. Accordingly, in spite that it operates only with the secondary cell 31, it can operate for a long. Accordingly, according to this embodiment, the operation panel 1 of a vehicle-mounted electric equipment can be used as a operation panel for the entire car audio under a normal state and as a small/portable type audio under a state of being removed from the main body 2. Accordingly, it will become possible to prevent the car audio from being stolen and enjoy music.

Here, suppose that the internal temperature increases while the operation panel 1 is operating with the external memory 120 under the state that it is either equipped to the main body 2 or is removed therefrom.

Then, Idetect/Iout that the optical sensor 121 outputs decreases gradually as shown in FIG. 3. The first processor 107 receives the output Idetect/Iout of the optical sensor 121 at an analogue port, etc., and brings this into A/D conversion, and checks this value with regular or irregular break-in processing.

When the output Idetect/Iout of the optical sensor 121 reaches the first reference level (a temperature corresponding with, approximately, 63 degrees) shown in FIG. 2, the first processor 107 notifies the user by way of display onto the display panel 108 as well as a warning sound from the loud-speaker 216 (even vocal sounds will do) that the temperature inside the apparatus increases and is of dangerous state.

Moreover, the first processor 107 controls the memory I/O 101 to prohibit an access to the external memory 120.

Normally, the user pushes the ejecting key 11b at this stage to take out the external memory 120.

On the other hand, when the temperature increases under the state that the external memory 120 is still mounted, and the output Idetect/Iout of the optical sensor 121 reaches the second reference level (a temperature corresponding with, approximately, 68 degrees) shown in FIG. 2, the first processor 107 instructs the expelling mechanism 122 to expel the external memory 120 forcibly. Accordingly, such an event can be prevented that the data stored in the external memory 120 are destroyed.

As described above, according to this embodiment, the external memory 120 is disposed in the operation panel 1 which is exposed outward. The temperature of the operation panel 1 is low compared with the temperature of the main body 2, and operational stability can be secured easily. Moreover, it is detachable.

In addition, only under the state that the operation of the external memory 120 is stable, an access to the external memory 120 is implemented. That is, under the state that the temperature of the external memory 120 is unstable, it will not be accessed.

Accordingly, under the stable state, the data can be read out from and written onto the external memory.

Moreover, since the external memory 120 is expelled forcibly when the temperature increases, such an event can be prevented that the stored data are lost.

In addition, the circuit to detect the temperature of the external memory is extremely simple, and the circuit will not be made complicated nor structure thereof be made larger.

In addition, the temperature of the external memory can be measured directly. The vehicle-mounted apparatus cannot measure the temperature of the external memory correctly by measuring only the temperature of atmosphere. The above described configuration is extremely effective for measuring the temperature of the external memory 120 correctly.

Incidentally, this invention will not be limited to the above described embodiment, and various kinds of variations as well as applications are possible.

For example, as the label to be stuck onto the external memory 120, such a type that will increase reflection rate in accordance with increase in temperature will do.

In addition, the configuration to detect the reflection rate is also optional.

Moreover, in the above described embodiment, the first processor 107 has detected that the reflection rate of the label has reached the first or the second reference level, but an optical sensor may be arranged to detect that the reflection rate of the label has reached the reference level and notify the first processor 107 accordingly in a form of a break-in signal, etc. so that the first processor 107 implements processing corresponding with the notification.

In addition, numerous reference levels may be set to give to the user a warning corresponding with the level.

The above described embodiment was exemplified by a car audio which stores music data into the external memory 120 for reproduction, but the data to be stored in the external memory 120 are optional.

For example, in the case of a navigation system to be mounted on a vehicle, the latest map data and store information are stored in the external memory 120, and with these image data, navigation is implemented.

In addition, when the operation panel 1 is removed from the main body 2, it can operate not only as small acoustic equipment but also as optional equipment. For example, it may be made to operate as a controller or a remote controller.

The appearance configuration or circuit configuration shown in the above described embodiment is just an example, and a change may be made appropriately. For example, the main body is not limited to a CD, and otherwise MD (minidisk), MO (Magneto-Optical disk), DVD-RAM (Digital Video Disc-RAM), etc. may be disposed. However, such apparatus comprises driving portion such as rotary driving portion, etc., and consumes comparatively a large electric power. Accordingly, they are not disposed in the operation panel 1, but disposed in inside the main body 2.

INDUSTRIAL APPLICABILITY

As described so far, according to the present invention I, music data can be distributed to a base station with satellite broadcasting, and moreover these can be transmitted wirelessly to a mobile station that stop by in the vicinity of the base station and be stored in a storing media.

In addition, according to the present invention II, a panel can be utilized effectively also when it is removed, and according to the present invention III, a semiconductor storing memory can be used within an appropriate temperature range and stored data can be protected.

The invention claimed is:

1. A contents distribution system comprising:
   transmission means for transmitting contents in a ciphered state via a satellite;
   at least one base station for receiving the ciphered contents from said satellite to accumulate the received contents; and
   a plurality of mobile stations each for communicating with corresponding one of said base stations via wireless to receive and reproduce the contents transmitted from said corresponding one of said base stations,
   wherein said transmission means serves to transmit decipher keys to said at least one base station via another route different from said satellite,
   wherein said base station stores each of the received ciphered contents together with its corresponding decipher key, and
   wherein said base station operates so as to certify each of said mobile stations, to decipher by using the stored decipher key the ciphered contents requested by the certified mobile station, and to re-cipher the deciphered contents by using a cipher key unique to the certified mobile station to transmit the re-ciphered contents to the certified mobile station.

2. The contents distribution system according to claim 1, wherein said base station comprises means for selecting and transmitting any of said accumulated contents via said wireless LAN.

3. The contents distribution system according to claim 2, wherein said base station comprises means for detecting the reproducing means which enters inside the communication area of a wireless LAN thereof, and means for transmitting contents to the detected reproducing means.

4. The contents distribution system according to any of claims 1–3, wherein said base station comprises designating means for designating reproducing means of a destination of transmission, and means for transmitting contents to the reproducing means designated by the designating means.

5. The contents distribution system according to any one of claims 1–3, wherein said base station is brought into connection with said transmitting means and comprises means to request said transmission means for transmitting desired contents, and
   said transmission means transmits in accordance with the request from said base station the requested contents via said satellite.

6. The contents distribution system according to any one of claims 1–3, further comprising accounting means for recording accounting information of each of said mobile stations, wherein:
   said base station makes inquiry to said accounting means and, in the case where it is notified by said accounting means that an accounting process has been finalized, transmits contents to said mobile stations; and
   said accounting means transmits notification showing whether or not the accounting process have been finalized in reply to inquiry from said base station.

7. The contents distribution system according to claim 6, wherein:

said transmitting means and base station are connected with a network of terrestrial systems different from communication using said satellite;

said base station inquires said accounting means via said network of terrestrial systems; and said accounting means transmits via said network of terrestrial systems a notification showing whether or not the accounting process is completed for the inquiry from said base station.

8. The contents distribution system according to any one of claims 1–3, wherein:

said base station stores contents under the encoded state together with encoding keys;

said each mobile station is certified, and after said each mobile station is certified, secret codes of the contents are deciphered;

said each mobile station encodes the deciphered contents with reproducible technique to transmit; and said each mobile station stores the received contents.

9. The contents distribution system according to any one of claims 1–3, wherein:

said base station packets data to transmit;

said each mobile station comprises means for receiving the data transmitted from said base station and confirming the received data, to request retransmission of the corresponding data to said station in the case where a portion thereof suffers from defects.

10. The contents distribution system according to claim 1, wherein said base station includes means for designating contents to said transmission to request the contents; and means for receiving the decipher keys of the contents from the transmissions in accordance with the request.

11. The contents distribution system according to claim 10, wherein:

said base station comprises means for receiving the code key from equipment as destination of transmission; and said base station comprises means for using the decipher keys to decode said contents and for further using the decipher keys received from equipment as destination for transmission to implement decoding for transmission.

12. A method for distributing contents, said method comprising the steps of:

transmitting contents in a ciphered state from a contents source via a satellite to at least one base station;

transmitting decipher keys for said contents via another route different from said satellite to said base station;

receiving and accumulating at said base station the ciphered contents from said satellite; and transmitting the contents from said base station to a plurality of mobile stations each for communicating with that base station to receive and reproduce the contents at each of said mobile stations, wherein said method further comprises the steps of:

storing at said base station each of the received ciphered contents together with its corresponding decipher key, and operating at said base station so as to certify each of said mobile stations, to decipher by using the stored decipher key the ciphered contents requested by the certified mobile station, and to re-cipher the deciphered contents by using a cipher key unique to the certified mobile station to transmit the re-ciphered contents to the certified mobile station.

* * * * *